No. 730,159. PATENTED JUNE 2, 1903.
F. RICHARDSON, J. J. HENDRICKS & F. MARKEY.
COMBINED CHURN AND BUTTER WORKER.
APPLICATION FILED JAN. 19, 1903.
NO MODEL. 2 SHEETS—SHEET 1.

Witnesses. Inventors

No. 730,159. PATENTED JUNE 2, 1903.
F. RICHARDSON, J. J. HENDRICKS & F. MARKEY.
COMBINED CHURN AND BUTTER WORKER.
APPLICATION FILED JAN. 19, 1903.
NO MODEL. 2 SHEETS—SHEET 2.

Witnesses.
W. S. Guest
H. L. Trimble

Inventors
F. Richardson
J. J. Hendricks
F. Markey
by their attorney
C. H. Ricks

No. 730,159.

Patented June 2, 1903.

UNITED STATES PATENT OFFICE.

FREDERICK RICHARDSON, JOHN J. HENDRICKS, AND FRANK MARKEY, OF ST. MARYS, CANADA, ASSIGNORS TO C. RICHARDSON AND COMPANY, OF ST. MARYS, CANADA.

COMBINED CHURN AND BUTTER-WORKER.

SPECIFICATION forming part of Letters Patent No. 730,159, dated June 2, 1903.

Application filed January 19, 1903. Serial No. 139,646. (No model.)

*To all whom it may concern:*

Be it known that we, FREDERICK RICHARDSON, JOHN J. HENDRICKS, and FRANK MARKEY, British subjects, and residents of St. Marys, in the county of Perth and Province of Ontario, Canada, have invented certain new and useful Improvements in a Combined Churn and Butter-Worker; and we hereby declare that the following is a full, clear, and exact description of the same.

This invention relates to certain new and useful improvements in that class of combined churns and butter-workers in which the cylinder is rotatably supported in a suitable frame and actuated by a suitable mechanism, such cylinder being fitted with a series of removable butter-working rollers arranged to be inserted into the cylinder through a central aperture at one side thereof, such butter-working rollers being rotated by the mechanism actuating or causing the rotation of the cylinder.

In carrying out the invention we journal the butter-working rollers in a movable frame supported by a swinging arm hinged at one end to the main frame of the apparatus, and we provide this movable frame with a gear-case in which is journaled a shaft arranged transversely to the mandrels of the butter-working rollers, such shaft and mandrels being fitted with intermeshing bevel gear-wheels, whereby the butter-working rollers can be rotated during the rotation of the transverse shaft, as hereinafter more fully set forth, and more particularly pointed out in the claims.

Figure 1:
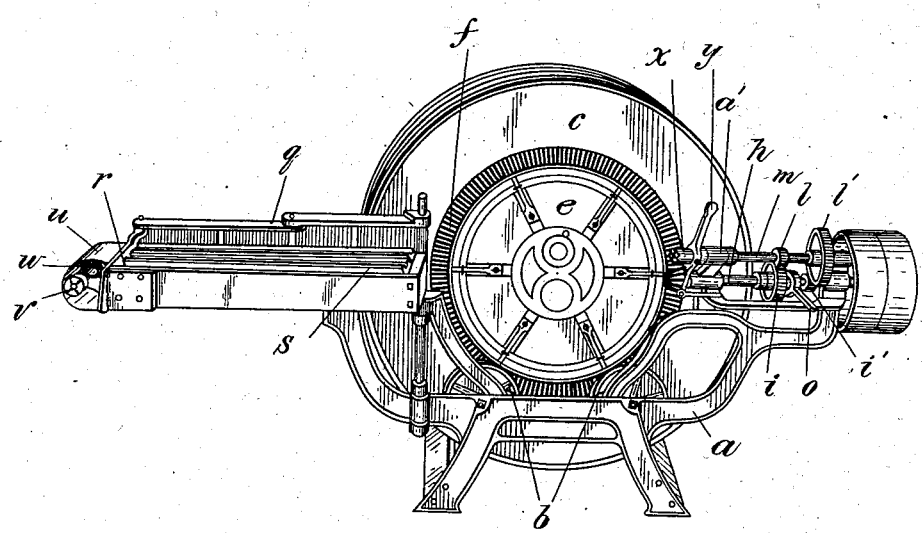
Figure 4:
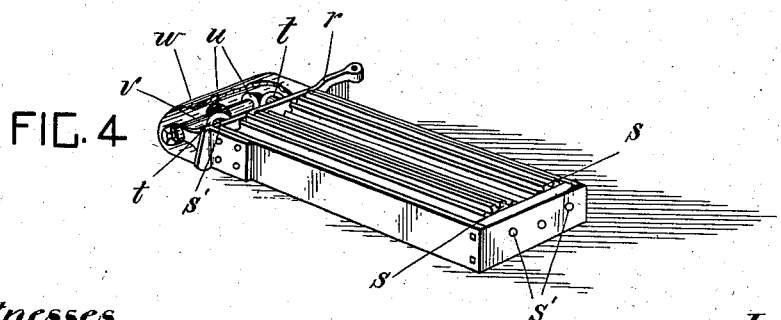
Figure 2:
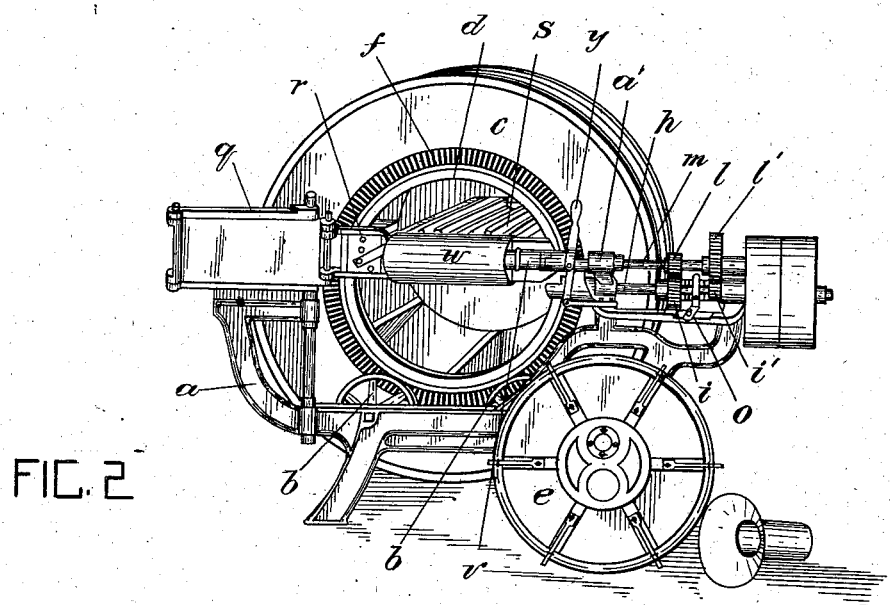
Figure 3:
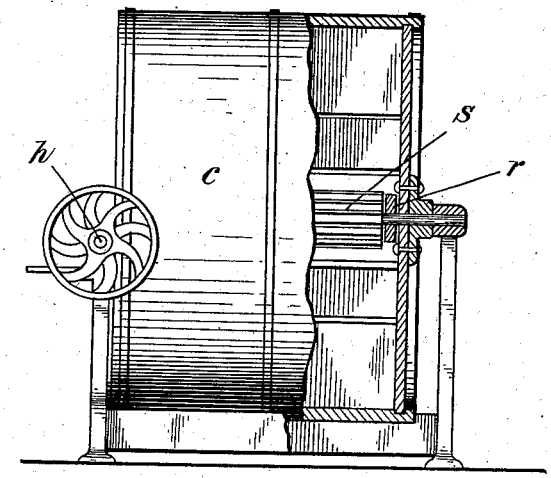

In the drawings, Figure 1 is a perspective view of the combined churn and butter-worker, showing the butter-working rollers withdrawn from the cylinder and the central aperture therein closed by a removable plate. Fig. 2 is a similar view to Fig. 1, showing the plate for closing the central aperture removed and the butter-working rollers inserted into the cylinder. Fig. 3 is an end elevation of the combined churn and butter-worker partly in section, showing a means for supporting the inner end of the movable frame for the butter-working rollers. Fig. 4 is a perspective view of the butter-working rollers, the movable frame therefor, and the gear-case and gearing.

Like letters of reference refer to like parts throughout the specification and drawings.

Journaled in the main frame $a$ are a set of bearing-wheels $b$, upon which is rotatably supported the cylinder $c$, having at one end a central aperture $d$, adapted to be closed by a removable plate $e$. Surrounding the aperture $d$ is an annular gear-wheel $f$, with which meshes a bevel-pinion rigidly mounted on the driving-shaft $h$, and rotatable therewith is a spur-wheel $i$ and a pinion $i'$, arranged to mesh respectively with a pinion $l$ and a spur-wheel $l'$, mounted on a counter-shaft $m$, the spur-wheel $i$ and pinion $i'$ being thrown into and out of engagement with the pinion $l$ and spur-wheel $l'$ by means of a lever $o$. By reference to Figs. 1 and 2 of the drawings it will be noticed that the driving and counter shafts are journaled in brackets $a'$, secured to the main frame $a$ at one side of the aperture $d$, and that the main frame at the other side of the aperture is fitted with a vertical post, upon which is hinged a jointed arm $q$.

To the free end of the jointed arm $q$ is hinged a movable frame $r$, in which are journaled the butter-working rollers $s$, having mandrels $s'$ projecting beyond the outer end of the frame and fitted with bevel-pinions $t$, meshing with corresponding bevel-pinions $u$, mounted on the pinion-shaft $v$, which is journaled in the gear-case $w$, connected to or forming part of the outer end of the frame $r$. The pinion-shaft $v$ projects beyond the gear-case $w$ and is adapted to be coupled to the counter-shaft $m$ by means of a coupling $x$, longitudinally movable on and rotatable with the counter-shaft $m$. When the apparatus is used as a churn, the coupling $x$ is disconnected from the pinion-shaft $v$ and the movable frame and the butter-working rollers are withdrawn from the interior of the cylinder and swung into the position shown in Fig. 1 of the drawings, the aperture $d$ then being closed by means of the removable plate $d'$ to retain the cream in the cylinder during the revolution of the same. When the cream has been churned into butter and the buttermilk has been drawn from the cylinder, the plate $c$ is removed from the aperture and the movable frame and butter-working rollers are placed within the cylinder by swinging the jointed arm $q$ and movable frame into the position shown in Fig. 2, and the coupling $x$ is moved by the lever $y$ to couple together the pinion-shaft $v$ and counter-shaft $m$ to cause the united rotation of the pinion and the counter shafts. The rotation of the pinion-shaft imparts by means of the bevel-pinions $u$ and $t$ rotary motion to the butter-working rollers and causes the butter-working rollers to rotate during the rotation of the cylinder to work up the butter as it is delivered to them. By employing the spur-wheel $i$ and pinion $i'$, meshing with the pinion $l$ and spur-wheel $l'$, respectively, the speed of the counter-shaft can be increased or reduced relatively to the speed of the main shaft—that is to say, by throwing the spur-wheel $i$ into mesh with the pinion $l$ and at the same time throwing the pinion $i'$ out of mesh with the spur-wheel $l'$ the speed of the counter-shaft can be increased over the speed of the main shaft, or by throwing the pinion $i'$ into mesh with the spur-wheel $l'$ and at the same time throwing the spur-wheel $i$ out of mesh with the pinion $l$ the speed of the counter-shaft can be reduced below that of the main shaft.

While we have shown and described a specific means for operating the butter-working rollers when the apparatus is to be employed as a butter-worker, we wish it understood that we do not lay any stress thereon, as we may vary this means or substitute therefor some other mechanism which will perform the same functions in substantially the same way.

Having thus fully described our invention, what we claim as new, and desire to secure by Letters Patent, is—

1. In a combined churn and butter-worker the combination of the main frame, a rotatable cylinder mounted therein having at one side a central opening, a swinging arm hinged to the main frame at one side of the central opening, a movable frame hinged to the free end of the swinging arm arranged to enter the rotatable cylinder longitudinally through the central opening and parallel with the longitudinal axis thereof, butter-working rollers journaled in the movable frame, a gear-shaft, means for transmitting motion from the gear-shaft to the butter-working rollers, a driving-shaft, and means for separably uniting the driving and gear shafts, substantially as specified.

2. In a combined churn and butter-worker the combination of the main frame, a rotatable cylinder mounted therein having at one side a central opening, a swinging arm consisting of two sections, one of which is hinged to the main frame at one side of the central opening and normally projects away from the same and the other of which is hinged to the outer end of the first section and is arranged to lie against the same when the butter-working rollers are within the rotatable cylinder, a movable frame hinged to the free end of the swinging arm arranged to enter the rotatable cylinder through the central opening, butter-working rollers journaled in the movable frame, and means for imparting motion to the butter-working rollers, substantially as specified.

3. In a combined churn and butter-worker the combination of the main frame, a rotatable cylinder mounted therein having at one side a central opening, a swinging arm consisting of two sections, one of which is hinged to the main frame at one side of the central opening and normally projects away from the same, and the other of which is hinged to the outer end of the first section and is arranged to lie against the same when the butter-working rollers are within the rotatable cylinder, a movable frame hinged to the free end of the swinging arm arranged to enter the rotatable cylinder through the central opening, butter-working rollers journaled in the movable frame, means for imparting motion to the butter-working rollers, a gear-shaft, means for transmitting motion from the gear-shaft to the butter-working rollers, a driving-shaft, and means for separably uniting the driving and gear shafts, substantially as specified.

4. In a combined churn and butter-worker the combination of the main frame, a rotatable cylinder mounted therein having at one side a central opening, a swinging arm consisting of two sections, one of which is hinged to the main frame at one side of the central opening and normally projects away from the same, and the other of which is hinged to the outer end of the first section and is arranged to lie against the same when the butter-working rollers are within the rotatable cylinder, a movable frame hinged to the free end of the swinging arm arranged to enter the rotatable cylinder through the central opening, butter-working rollers journaled in the movable frame, and means for imparting motion to the butter-working rollers, the outer end of the movable frame extending across the central opening, a gear-case connected thereto, a gear-shaft journaled in the gear-case, means for transmitting motion from the gear-shaft to the butter-working rollers, a driving-shaft, a fixed clutch member for one of the shafts and a movable clutch member for the other to separably and revolubly unite the driving and gear shafts, substantially as specified.

5. In a combined churn and butter-worker, the combination of the main frame, a rotatable cylinder mounted therein, a double-jointed swinging arm hinged to the main frame, a movable frame hinged to the swinging arm, butter-working rollers journaled in the movable frame having their mandrels projecting beyond the outer end of the same, a shaft journaled in the movable frame transversely to the projecting mandrels, gear-wheels mounted upon the transverse shaft and mandrels and means for transmitting motion to the transverse shaft substantially as specified.

6. In a combined churn and butter-worker the combination of the main frame, a rotatable cylinder mounted therein, a double-jointed swinging arm hinged to the main frame, a movable frame hinged to the swinging arm, butter-working rollers journaled in the movable frame having their mandrels projecting beyond the outer end of the same, a gear-case connected to the outer end of the movable frame, a shaft journaled in the gear-case arranged transversely to the mandrels of the butter-working rollers, gear-wheels mounted on the shaft and mandrels and means for transmitting motion to the shaft, substantially as specified.

St. Marys, January 12, 1903.

FRED. RICHARDSON.
    JOHN J. HENDRICKS.
    FRANK MARKEY.

In presence of—
 C. E. WHELIHAN,
 L. HARSTONE.